United States Patent [19]

Ludwig, Jr. et al.

[11] Patent Number: 5,170,287
[45] Date of Patent: Dec. 8, 1992

[54] METHOD FOR HIDING SCRATCHES OR IMPERFECTIONS ON THE SURFACE OF SCREENS USED IN PROJECTION SYSTEMS

[75] Inventors: Edward G. Ludwig, Jr., Mouans-Sartoux, France; Shinzo Ushida, Nara Prefecture, Japan

[73] Assignee: Rohm and Haas Company, Philadelphia, Pa.

[21] Appl. No.: 803,240

[22] Filed: Dec. 5, 1991

[30] Foreign Application Priority Data

Jan. 16, 1991 [JP] Japan .................................. 3-73555

[51] Int. Cl.$^5$ .............................................. G03B 21/56
[52] U.S. Cl. ...................................... 359/452; 359/453
[58] Field of Search ................................. 359/452, 453

[56] References Cited

U.S. PATENT DOCUMENTS 3,679,451  7/1972  Marks et al. ......................... 359/452
3,751,527  8/1973  Bortnick .............................. 260/899

FOREIGN PATENT DOCUMENTS 269324  11/1987  European Pat. Off. .
342283   5/1988  European Pat. Off. .

Primary Examiner—Richard A. Wintercorn
Attorney, Agent, or Firm—Lowell H. McCarter

[57] ABSTRACT

A novel light diffusing resin (material) has been invented which combines excellent light diffusing properties with high light transmission. The combination of properties is possible because the material does not significantly backscatter light. Also, the material exhibits good contact clarity. This light diffusing material is an excellent choice for use in projection systems as a method for hiding scratches or imperfections in a rear projection screen such as TV screen, rear projected slides, liquid crystal display (LCD) screens or thin layer electric decoration sheet by using a plastic sheet containing a specific light diffusing particles therein and having a combination of properties including high light transmission properties that does not significantly backscatter ambient light from outside illuminating sources.

12 Claims, 2 Drawing Sheets

METHOD FOR HIDING SCRATCHES OR IMPERFECTIONS ON THE SURFACE OF SCREENS USED IN PROJECTION SYSTEMS

The present invention relates to a method for hiding scratches or imperfections in a rear projection screen such as TV screen, rear projected slides, liquid crystal display (LCD) screens or thin layer electric decoration sheet by using a plastic sheet containing a specific light diffusing particles therein.

In recent television technologies, a size of screens for Braun tubes is limited to the size of less than 50 inches even in large screen type televisions because the inside of a cathode ray tube is vacuum. A larger TV screen can be used in rear projected displays. There are two types in projected displays, a rear projected type and a front projected type. Slides are generally used as a front projected type and white cloth or white plastic screens are commonly used as screens thereof. When we use a translucent sheet, a rear projection is also able to be used in viewing slides.

Further, along with the recent development of LCD technology field, various liquid crystal displays are beginning to be used in electronic field.

EPC publication 0269324, Jun. 1, 1988 and EPC publication 0342283, Nov. 23, 1989 disclose an excellent light transmittance plastic sheet which is translucent. Further use of light diffusing compositions as a rear projection screen is also disclosed in these publications.

Various image screens or displays heretofore mentioned are shaded or darkened if the screens or displays have scratches or imperfections on the surface on sheet materials. Therefore, most careful handling is required in supply of these materials for projected image screens. The inventors of the present inventions found that the light diffusing compositions disclosed in the above identified EPC Publications hide the defects of scratches or other imperfections on the surface when images from various sources are projected onto the screens. The present inventions relate to use of the light diffusing compositions described in the EPC publications as screens for LCD's or screen covers for cathode ray tube screens.

The present inventors found that plastic sheets comprising the polymer composition disclosed in EPC publication 0269324 and 0342283 cause no significant distortions, bright or dark, on projected image even if the plastic sheet has scratched or other minor imperfections on the surface to which images may be projected.

Generally, a scratch of imperfection on the surface of any material changes the light scattering effects in the vicinity of the scratch and imperfections can appear as either a bright or dark image. Such an image is visible through a typical diffusing material because light passing through the scratch or imperfection is backscattered to a different degree.

Thus, a brighter or dimmer image of the scratch or imperfection relative to the brightness of the rest of the screen occurs and is visible to an observer. Because the plastic sheet comprising polymer compositions disclosed in EPC publications does not backscatter light significantly but does efficiently diffuse light, the image of a scratch or imperfection is diffused and hidden from an observer. The use of said polymer composition as the diffusing sheet for a rear projection screen or backlit LCD screen is of benefit to such screen manufacturers. Because minor scratches or imperfections can be hidden and not easily detected by an observer, the productivity for such products can be increased since the reject rate can be decreased. Especially recent LCD displays or color TV screens cannot be permitted to have any scratches or imperfections. Therefore, the present invention has great significance.

Next, light diffusing material used in the present invention will be explained below:

In the sheet, synthetic resins are used as matrixes. Examples of synthetic resins used herein include but are not limited to polyolefinic resins such as polyethylene and polypropylene; olefin-vinyl acetate copolymers; resins of polyalkyl (meth)acrylates such as polymethyl (meth)acrylate; vinyl chloride resins; polyesters; polyamide resins such as nylons; polycarbonate; polystyrene; styrene-acrylonitrile copolymers polyvinylidene fluoride, and polysulfones, phenol type resins alone or in combination or as copolymers.

The foregoing synthetic resins preferably have both heat resistance and impact resistance.

The sheet of the invention is characterized in that a light diffusing agent is contained in a matrix composed of one or more of the foregoing synthetic resins listed. As the light diffusing agent, particles of an organic polymeric compound are preferred because of their proper light transmittance and excellent light diffusion properties and specific examples thereof include alkyl (meth)acrylate type resins, monovinylarene type resins such as styrene type resins and vinyl carboxylate resins. These light diffusing agents may be homopolymers, copolymers or mixtures as well as multi-staged polymeric materials. Preferred are alkyl acrylate type resins and more preferably used are those comprising a core of such alkyl acrylate resins which are further covered with layers of the foregoing resins. Examples of the latter are polymer particle compositions as disclosed in EPC publications 0269324 and 0342283.

The light diffusing agent particles used are in general substantially spherical in shape and their average particle size ranged from 0.1 to 500 microns. The term "average particle size" is herein referred to that determined by a Nanosizer. Moreover, the particles preferably have a particle size distribution in which the particle size of at least 90% by weight of the particles falls within the range of the average particle size of ±20%. The refractive index ($n_D$) of the light diffusing agent preferably has the following correlation with the refractive index of the foregoing matrix synthetic resin (Nm) in view of obtaining good diffusion properties:

$$0.003 \leq |n_M - n_D| \leq 0.2$$

(the term "refractive index" herein means ($n_D{}^{25}$).

The aforesaid light diffusing agent particles are incorporated into the foregoing synthetic resin (matrix) in an amount ranging from 0.1 to 40% by weight. These particles are preferably dispersed in the matrix uniformly whereby good light diffusion properties would be achieved.

Particularly preferred materials which comprise synthetic resins and light diffusing particle agents mixed and dispersed therein are polymer compositions as disclosed in the above-identified EPC publications. More specifically, the polymer compositions are thermoplastic or thermosetting polymer compositions which comprise thermoplastic or thermoset matrix polymers and light diffusing polymer particles dispersed in the matrix in an amount ranging from 0.1 to 40% by weight on the basis of the total weight of the composition, the polymer particles having an average particles size ranging from 2 to 15 microns and a particle size distribution in which the particle size of at least 90% by weight of the particles falls within the range of the average particles size ±20% and the particles being substantially spherical in shape. When the polymer composition is a light scattering composition based on a thermoplastic polymer matrix and the spherical polymer particles constitute 0.1 to 10% by weight of the total weight of the composition, particularly preferred spherical polymer particles are core/shell polymer particles composed of a core of a rubber-like alkyl acrylate polymer (wherein the alkyl group has 2 to 8 carbon atoms) which is copolymerized with up to 5% of a cross-linking agent with up to 5% of a graft linker (the amount is based on the total weight of the core) and whose refractive index $n_D^{25}$ is in the range of that of the matrix polymer $(n_M)\pm0.2$, preferably out of the range of the refractive index $(n_M)\pm0.003$; and at least one polymer shell (the outermost layer is compatible with the matrix polymer and where the shell(s) constitute 5 to 40% of the weight of the particle).

The particles of the light diffusing agent may be mixed with and dispersed in the synthetic resin according to any known manner. For instance, the following methods may be applied: (1) a method comprising kneading a synthetic resin and a light diffusing agent in an extruder and then forming the mixture into a sheet, (2) a method for forming a sheet according to a co-spray method; and (3) a method (disclosed in U.S. Pat. No. 3,751,527) comprising mixing an emulsion type synthetic resin and an emulsion containing particles of the light diffusing agent, coagulating the both together utilizing coagulant and then molding it.

Figure 1:
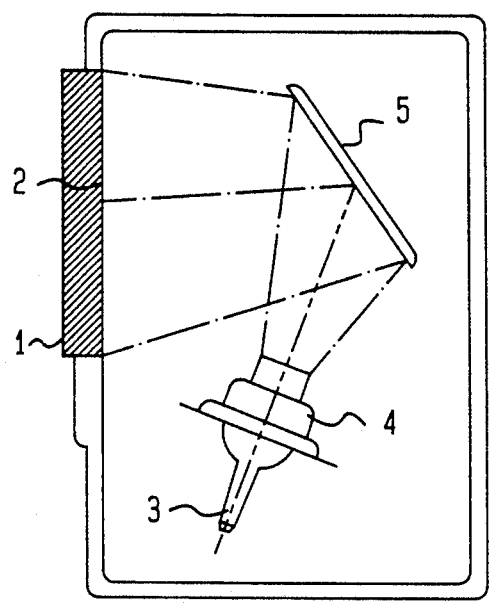
FIG. 1 represents a rear projection system for Television.

In FIG. 1, a cover (1), protects the outside of the light diffusing polymeric screen (2) from objects that might come in contact with and damage the projection screen. The image bearing beams emanating from the cathode ray tube (3) is focused by a lens (4) on the projection mirror (5). The image bearing beams are reflected from the projection mirror (5) onto the rear side of the light diffusing polymer screen (2). Any manufacturing defects such as scratches or imperfections in the light diffusing polymer screen (2) are minimized by the use of the light diffusing agent of the present invention when used in the synthetic resin matrix.

Figure 2:
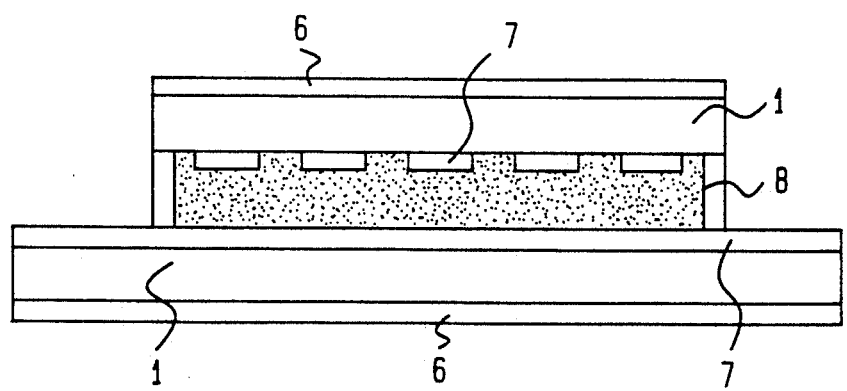
FIG. 2 represents a liquid crystal display.

FIG. 2 represents a display system that transforms data from an electrical domain to an optical domain. The system can be used for digital displays from liquid crystals (LCD) and visible light emitting diodes (VLED) as used in such products as electronic watches, calculators, microwave oven controls, computer connect display systems, VCR displays and has the potential in the manufacture of flat thin television screens. The liquid crystal display (LDC) (8) is sandwiched between two light diffusing polymer sheets (1), with appropriate electrodes (7) adjacent to the liquid crystal to provide a means for displaying changes in electrical signals. The light diffusing polymer sheets (1) are sandwiched between upper and lower transparent polarizable plates (6). The lower polarizable plate (6) may be coated on its outside surface with a diffuse reflector, i.e., a mirror.

Figure 3:
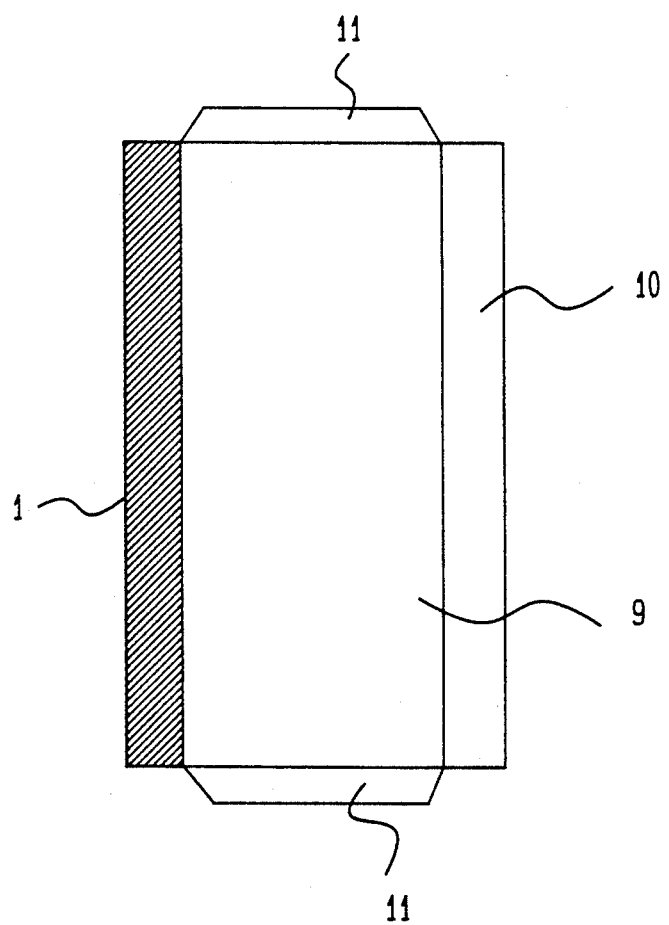
FIG. 3 represents a thin electric display decoration message board.

FIG. 3 represents the use of a light diffusing polymer sheet in a relatively thin edge light type of decoration board. In such a system the message to be conveyed may be a pattern of the message affixed on the reflection surface of panel (10). Light sources (11) provide a means to reflect light from surface of panel (10) to and through the light diffusing polymer sheet (1). The message affixed on panel (10) then appears as a darkened pattern on the surface of the light diffusing polymer sheet (1).

Light diffusing polymer composition sheets used in actual examples described above are prepared as follows. The thickness of the sheet is about 3 mm.

(1) Manufacturing example of light diffusing polymer particles.

| Components | Amount parts by weight (pbw) |
|---|---|
| Mixture A | |
| Water | 162 |
| Potassium carbonate | 0.12 |
| Mixture B | |
| Butyl acrylate | 66 |
| Styrene | 15 |
| n-Octyl mercaptan | 19 |
| 10% Aqueous solution of sodium dodecylbenzene-sulfonate | 5.3 |
| Water | 19 |
| Mixture C | |
| Potassium persulfate | 0.014 |
| Water | 1.4 |
| Mixture D | |
| Potassium persulfate | 0.014 |
| Water | 8.3 |

Step A

Mixture A was charged into a reactor provided with a stirrer and a condenser and blanketed with nitrogen gas and heated to 87° C.

To the stirred reactor contents there were added 7% of the mixture B and all of the mixture C and the contents were stirred for 30 minutes. Thereafter, the remaining mixture B and the mixture D were added to the contents over 90 minutes with stirring. The contents of the reactor were maintained at 87° C. for 50 minutes with stirring, then the resultant Step A polymer emulsion was cooled to room temperature.

The particle size of the resultant polymer (butyl acrylate-styrene copolymer) particles contained in the Step A polymer emulsion was determined by a Nanosizer and was found to be about 0.3 micron.

Step B

Furthermore, the following mixtures was prepared:

| Components | Amount (pbw) |
|---|---|
| Mixture A | |
| Butyl acrylate | 98 |
| Butylene glycol diacrylate | 0.50 |
| Alkyl methacrylate | 2.0 |
| Benzoyl peroxide | 0.80 |
| Mixture B | |
| Magnesium p-nitrosophenolate | 0.011 |
| Water | 226 |
| 10% Aqueous solution of sodium dodecylbenzenesulfonate | 3.1 |
| Mixture C | |
| Step A polymer emulsion | 1.5 |

The Mixture A and B were admixed with each other in a Waring Blender for 3 minutes to obtain an emulsion. This emulsion was introduced into a pressure reactor to which 1.5 pbw of Mixture C Step A polymer emulsion had been charged and the contents of the reactor were stirred for one hour under a nitrogen blanket. The reactor was sealed, was shaken at 68° C. for 3 hours in a water bath and then cooled to room temperature. The resultant Step B polymer emulsion contained a polymer having a particle size of about 2 microns.

Step C

The procedure of aforementioned Step B was repeated, except that 23 pbw of the Step B emulsion polymer was used rather than Step A polymer emulsion. The polymer particles in the Step C polymer emulsion had a diameter of approximately 5 microns.

Step D

The following mixture was prepared:

| Components | Amount (pbw) |
| --- | --- |
| Mixture A | |
| Step C polymer emulsion | 1348 |
| Mixture B | |
| Methyl methacrylate | 96 |
| Ethyl acrylate | 4.0 |
| Mixture C | |
| 3% Aqueous sodium formaldehyde sulfoxylate | 10 |
| 10% Aqueous sodium dodecylbenzene-sulfonate | 1.5 |
| Water | 53 |
| Mixture D | |
| t-Butyl hydroperoxide | 0.45 |
| Water | 14 |

Mixture A (Step C polymer emulsion) was weighed into a reactor equipped with a stirrer and a condenser and blanketed with nitrogen. The reactor contents were heated to 65° C. and stirred under the nitrogen blanket, Mixtures B, C and D were separately added to the reactor over a period of 90 minutes. The temperature was maintained at 55° C. and stirring was continued for 30 minutes, after which the reactor contents were cooled to room temperature. The resulting particles in the Step D polymer emulsion were about 5 microns in diameter, with less than about 20% by weight of particles less than about 5 microns in diameter.

The light diffusing agent (multi-stage polymer) thus prepared has a refractive index ($n^{D25}$) of 1.46.

(2) Preparation of a light diffusible resin composition

The light diffusing agent obtained in Step D above was coagulated with a calcium hypophosphite coagulant to isolate it from an aqueous suspension and 5 parts by weight of the light diffusing resin agent was melt-blended at 232° with 15 parts by weight of a synthetic matrix resin. In this example a poly(methyl methacrylate) resin molding powder having a weight-average molecular weight of about 120,000 was the matrix resin.

The refractive index ($n_D^{25}$) of poly (methyl methacrylate) used herein as the matrix for the surface layer was 1.49.

(3) Preparation of sheet

Prepared light diffusible resin composition was molded into sheet having 3 mm thickness by using an extruder.

What is claimed:

1. A method for hiding scratches or imperfections on the surface of screens by using a translucent sheet as a screen cover for projection screens, said translucent sheet having a thickness of from about 0.1-5 mm comprising a synthetic resin matrix containing light diffusing substantially spherical shaped polymer particles and having 80% or more of light transmittance.

2. The method of claim 1 wherein the light diffusing polymer particles are substantially spherical having a diameter from about 2 to about 15 microns and a size distribution such that 90% of the particles are within ±20% of the average particle diameter.

3. The method of claim 2 wherein the translucent sheet is used as a screen in a rear projection screen, a display system transforming electrical domain to optical domain, edgelit decoration board, sidelit decoration board, or backlit decoration board.

4. The method of claim 2 wherein the synthetic resin matrix comprises a thermoplastic or thermoset polymer and, distributed throughout the polymer, from about 0.1% to about 40% of the total composition weight of spherical polymer particles having an average diameter of from about 2 to about 15 μm and a size distribution such that at least 90% by weight of the polymer particles fall with +20% of the average particle diameter.

5. The method of claim 2 wherein the light diffusing polymer particles the polymer particles comprise a rubbery alkyl acrylate copolymer, the alkyl group having from 2 to 8 carbon atoms.

6. The method of claim 5 wherein the alkyl acrylate copolymer is a copolymer of the alkyl acrylate and one or more copolymerizable monovinyl monomers selected from the group consisting of alkyl methacrylates and vinyl arenes.

7. The method of claim 6 wherein the copolymerizable monovinyl monomer comprise styrene.

8. The method of claim 5 wherein the alkyl acrylate copolymer is surrounded by one or more shells, the outer of which is surrounded by one or more shells, the outer shell of which is compatible with the matrix polymer, and which comprise from about 0.1 to about 40% of the weight of the particles.

9. The method of claim 4 wherein the light diffusivity of the polymer particles is superior to that of the matrix polymer and the polymer particles have a refractive index within about ±0.2 units of, but no closer than about ±0.003 units to, the refractive index of the synthetic resin matrix.

10. The method of claim 2 wherein from about 0.1 to about 10% weight of the polymer particles based on weight of matrix polymer are distributed throughout the synthetic resin matrix polymer.

11. The method of claim 3 wherein the light diffusing particles were prepared in a multi-staged emulsion process.

12. The method of claim 1 wherein the size of the light diffusing spherical particles are not greater than about 5 microns in diameter.

* * * * *